(12) United States Patent
Suzuki et al.

(10) Patent No.: US 6,630,256 B2
(45) Date of Patent: Oct. 7, 2003

(54) MAGNETIC RECORDING MEDIUM COMPRISING A NON-MAGNETIC LAYER HAVING INORGANIC PARTICLES OF SPECIFIC SIZE AND DISTRIBUTION

(75) Inventors: Masaki Suzuki, Kanagawa (JP); Toshihiko Miura, Kanagawa (JP); Masatoshi Takahashi, Kanagawa (JP); Hiroaki Takano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/919,405

(22) Filed: Jul. 31, 2001

(65) Prior Publication Data

US 2002/0119349 A1 Aug. 29, 2002

(30) Foreign Application Priority Data

Aug. 3, 2000 (JP) ........................................ 2000-236061
Aug. 18, 2000 (JP) ........................................ 2000-248189

(51) Int. Cl.$^7$ ................................................. B32B 5/16
(52) U.S. Cl. ........................ 428/694 BA; 428/694 BB; 428/694 BR
(58) Field of Search .................... 428/694 BA, 694 BB, 428/694 BR

(56) References Cited

U.S. PATENT DOCUMENTS

| | | | | |
|---|---|---|---|---|
| 5,384,175 A | * | 1/1995 | Kojima et al. | 428/64 |
| 5,508,117 A | * | 4/1996 | Kawamata et al. | 428/610 |
| 5,795,642 A | * | 8/1998 | Ishikawa et al. | 428/141 |
| 5,804,283 A | * | 9/1998 | Inaba et al. | 428/141 |
| 5,989,680 A | * | 11/1999 | Wakana et al. | 428/141 |
| 6,037,030 A | * | 3/2000 | Noguchi et al. | 428/65.3 |
| 6,444,290 B1 | * | 9/2002 | Takahashi et al. | 428/141 |

\* cited by examiner

*Primary Examiner*—H. Thi Le
(74) *Attorney, Agent, or Firm*—Stroock & Stroock & Lavan LLP

(57) ABSTRACT

Provided is a magnetic recording medium with a total thickness equal to or less than 8 μm having good electromagnetic characteristics and good repeat running durability in which the dropping of powder onto the running path and tape edge deformation are prevented and a magnetic recording medium with a total thickness equal to or less than 8 μm having good electromagnetic characteristics, good repeat running durability, and good dimensional stability. A magnetic recording medium having on one surface of a non-magnetic support a lower layer comprising an inorganic powder and a binder and an upper magnetic layer comprising a ferromagnetic powder and a binder in that order, and having on the other surface thereof a backcoat layer, wherein: said nonmagnetic support comprises inorganic powder particles with a mean primary particle diameter in a range of from 40 to 200 nm; the number of particles of said inorganic powder in the cross-section of said nonmagnetic support is in a range of from 10 to 200/100 μm$^2$, said nonmagnetic support exhibits a coercivity in a range of from 159 to 239 kA/m; and the overall thickness is equal to or less than 8 μm. A magnetic recording medium having on one surface of a nonmagnetic support a lower layer comprising an inorganic powder and a binder and an upper magnetic layer comprising a ferromagnetic powder and a binder in that order, and having on the other surface thereof a backcoat layer, wherein: said nonmagnetic support comprises inorganic powder particles with a mean primary particle diameter in a range of from 10 to 200 nm; the number of particles of said inorganic powder in the cross-section of said nonmagnetic support is in the range of from 10 to 200/100 μm$^2$, the amount of curl d in the direction of width of said magnetic recording medium is equal to or higher than 0.4 mm and equal to or less than 1.0 mm in the direction of protrusion of the magnetic layer at a width of 6.35 mm; and the overall thickness is equal to or less than 8 μm.

9 Claims, No Drawings

MAGNETIC RECORDING MEDIUM COMPRISING A NON-MAGNETIC LAYER HAVING INORGANIC PARTICLES OF SPECIFIC SIZE AND DISTRIBUTION

FIELD OF THE INVENTION

The present invention relates to a particulate magnetic recording medium with a total thickness equal to or less than 8 μm, and more particularly, to a magnetic recording medium having good electromagnetic characteristics and running durability. Further, the present invention relates to a magnetic recording medium, having a magnetic layer comprising a ferromagnetic powder dispersed in a binder, which is provided on a nonmagnetic support, and more particularly, a magnetic recording medium having good electromagnetic characteristics, running durability, and dimensional stability.

RELATED ART

Magnetic recording media are widely employed as recording tapes, video tapes, floppy disks, and the like.

Magnetic recording media may be divided into tape media and disk media. The configuration of both is multilayered, with a magnetic layer formed over a nonmagnetic support. However, in tape media, a backcoat layer is present when needed on the reverse surface from the surface on which the magnetic layer is provided. In disk media, magnetic layers are provided on both sides of the nonmagnetic layer support.

Magnetic recording media may be further divided into particulate magnetic recording media and vapor deposition magnetic recording media.

Generally, in particulate magnetic recording media, a ferromagnetic powder is dispersed in a binder; lubricants, abrasives, and as necessary, carbon are added; and the mixture is coated on a nonmagnetic support. In recent years, the magnetic layer has become increasingly thinner to enhance the output of the magnetic layer. Thus, magnetic recording media have been developed in which an intermediate layer (lower layer) is provided between the nonmagnetic support and magnetic layer.

In vapor deposition magnetic recording media, a vacuum vapor deposition method is employed to form a magnetic film on a nonmagnetic support. The magnetic film is formed by vaporizing and depositing a metal or alloy comprised chiefly of cobalt in an oxygen atmosphere, and as needed, forming a protective film or lubricant film over the vapor deposited magnetic film.

With respect to the magnetic recording media obtained, higher original sound reproduction capability is demanded of audio tapes used for sound recording and reproduction; good original image reproduction capability is demanded of video tapes; and high durability without loss of data is demanded of backup tapes and disks employed in computers.

To ensure such good electromagnetic characteristics and durability, magnetic materials with high Hc levels and high degrees of orientation and thin-layer coatings have been made, and protective films for the magnetic layer have been developed. Lubricants have also been developed to reduce the friction coefficient of the magnetic layer and/or backup layer.

On the recording and reproducing device side, shortening of the recording frequency wavelength and narrowing of the track width of the magnetic recording head are progressing as means of increasing the recording capacity per unit area.

For example, in cartridge-type recording media, the cartridge capacity is left unchanged, the tape is made thinner, and more tape is wound to achieve extended and high-capacity properties. A typical example is the increased capacity achieved between the DDS-2 system and DDS-3 system computer backup tapes ("Report of an Investigation into Production and Demand Trends and Technology Trends in Recording Media of the World," published by the Japan Recording Media Industry Association, p. 97).

The above-mentioned increase in surface recording density by narrowing the track of the recording and reproducing head is progressing each year. Specifically, typical examples are the Long-Play mode in 8 mm video systems and the Zip disk system of IOMEGA corporation.

In such systems, control of the position of the recording and reproducing head and the magnetic recording medium are important. In tape media, comparatively stable running is required during running in a recording and reproducing device. Accordingly, various guides have been proposed for mounting in recording and reproducing devices to achieve stable running (Japanese Patent No. 2,976,685). Further, flanges have been mounted on the rotating guides and stationary guides to stabilize running in magnetic recording media. These flanges are generally fixed flanges. The tape running position is regulated by adjusting the height of the flange, and the precision of the flange position is important to stable running.

However, when the tape running position is regulated at a position where the edge of the tape rubs heavily, the contact pressure during running between the edge of the tape and the guide flange increases. Repeated running ends up imparting running scratches to the surface of the guide flange. As a result, these scratches damage the tape edge surface, causing the magnetic layer, intermediate layer, and/or backcoat layer coated on the nonmagnetic support to fall off.

As regards the durability of the magnetic layer surface, the development of highly durable binders and the development of lubricants for reducing the friction coefficient have progressed in recent years. As a result, products have been developed that do not fail even in systems in which the speed of the head relative to the tape is 10 m/s or greater, such as the D3 system.

However, attempts have been made to reduce the capacity of cassette cases in addition to increasing the recording density of magnetic recording media that are housed in cassette cases. Thinning of the tape itself is progressing simultaneously with increases in the density of magnetic recording medium.

With thinning of the tape, materials with increased rigidity from polyethylene terephthalate to polyethylene napthalate and further polyamides have been sequentially come the use as the nonmagnetic support. However, since the bending rigidity of the tape decreases in proportional to the cube of the thickness, it is impossible to avoid a decrease in tape strength as the tape becomes thinner, even through the use of a highly rigid materials.

Generally, when the tape runs within a recording and reproducing device for recording or reproduction, it weaves in and out. However, when the track of the recording and reproducing head is narrowed, it becomes necessary to regulate the tape running position with greater precision than has previously been the case by means of a guide flange, so that the recording and reproducing head is not prevented from tracing a straight line on the tape. In systems both employing such thinner tapes and regulating the tape running position more precisely than has previously been the case, both the durability of the magnetic layer surface and the edge of the tape are important.

Japanese Unexamined Patent Publication (KOKAI) Heisei No. 9-180173 proposes coating a protective layer on the slit end surface to increase durability. However, the coating of a protective layer on the end surface after the slit has drawbacks in that the protective solution may ooze out onto the magnetic layer during coating, increasing the cost of coating and making it impossible to provide an inexpensive tape.

To prevent edge damage from occurring during continuous repeat running in magnetic recording and reproducing devices, the support by a nonmagnetic support is significant. A nonmagnetic support (polyethylene terephthalate (PET), polyethylene naphthalate (PEN), or the like) equal to or higher than 6 μm is normally employed in a magnetic recording medium with a total thickness equal to or higher than 8 μm to achieve stable repeat running with little edge damage. By contrast, an aromatic polyamide (aramid) base is now employed instead of the polyethylene terephthalate (PET), polyethylene naphthalate (PEN), or the like, that was conventionally employed as the nonmagnetic support in recording media having a total thickness of less than 8 g m (Japanese Patent No. 2,724,581).

Further, in recording media equal to or less than 8 μm in total thickness, it is also necessary to reduce the thickness of the nonmagnetic support. To prevent edge damage even with reduction in thickness, an aromatic polyamide (aramid) base is now employed instead of the conventionally employed polyethylene terephthalate (PET), polyethylene naphthalate (PEN), or the like (Japanese Patent No. 2,724,581).

However, even if using an aramid base, when tape travel position regulation and guide flange regulation are made strict to ensure stable reproduction output and interchangeability between multiple reproducing devices, edge deformation due to repeat VTR running is not prevented, powder drops onto the running path, and the tape edge is deformed.

Further, in systems in which storage is highly important, such as business use and data storage, it is necessary to ensure dimensional stability over long periods of storage even in thin tapes. Accordingly, it is required for the nonmagnetic support not only to be durable against an edge damage but also to have good dimensional stability over long-term storage.

SUMMARY OF THE INVENTION

Accordingly, one object of the present invention is to provide a magnetic recording medium with a total thickness equal to or less than 8 μm having good electromagnetic characteristics and good repeat running durability in which the dropping of powder onto the running path and tape edge deformation are prevented.

The second object of the present invention is to provide a magnetic recording medium with a total thickness equal to or less than 8 μm having good electromagnetic characteristics, good repeat running durability, and good dimensional stability.

The present invention relates to a magnetic recording medium (referred to hereinafter as magnetic recording medium (1)) having on one surface of a nonmagnetic support a lower layer comprising an inorganic powder and a binder and an upper magnetic layer comprising a ferromagnetic powder and a binder in that order, and having on the other surface thereof a backcoat layer, wherein:

said nonmagnetic support comprises inorganic powder particles with a mean primary particle diameter in a range of from 40 to 200 nm;

the number of particles of said inorganic powder in the cross-section of said nonmagnetic support is in a range of from 10 to 200/100 μm said magnetic layer exhibits a coercivity in a range of from 159 to 239 kA/m; and, the overall thickness is equal to or less than 8 μm.

The present inventors observed in great detail the effects occurring during repeat running of a tape magnetic recording medium in a magnetic recording and reproducing device. As a result, they discovered that deformation of the tape edge was caused by repeat contact between the tape guide flange and the tape edge during repeat running, with the edge of the magnetic layer, support, and backcoat layer being scraped a large number of times, resulting in plastic deformation. In particular, it was thought that the plastic deformation of the support depended on the number of particles that were added, and that through sliding contact with the guide, the filler particles were subjected to a force in the running direction by minute protrusions on the surface of the guide flange and moved on the support with deforming the support, thereby promoting plastic deformation. Further, dropping out of the filler generated an abrasive effect with the tape guide flange, promoting deformation of the nonmagnetic support.

That is, the present inventors discovered that the fewer particles added to the nonmagnetic support, the more deformation of the edge of the nonmagnetic support could be prevented. However, when the quantity of filler added was excessively small, suitability to production of the nonmagnetic support and suitability to production of the magnetic recording medium were compromised; optimization was thus required.

Accordingly, the present inventors discovered that the optimum points fell within the following ranges. The primary particle diameter of the filler dispersed in the support ranges from 40 to 200 nm, preferably from 40 to 180 nm. The number of inorganic powder particles as measured by electron microscope on the support surface of the tape cross-section is preferably equal to or less than 200 pieces/100 μm$^2$, more preferably equal to or less than 180 pieces/100 μm$^2$. Further, when the number of inorganic powder particles as measured by electron microscope on the support surface of the tape cross-section is lower than 10 pieces/100 μm$^2$, the slipping property of the support surface is inadequate and handling during production becomes difficult. Thus, the number of inorganic powder particles in the cross-section in the direction of thickness of the support is equal to or higher than 10 pieces/100 μm$^2$, preferably equal to or higher than 200 pieces/100 μm$^2$.

The term "number of inorganic powder particles in the cross-section in the direction of thickness of the support" means the average value of the number of particles of inorganic powder over the entire cross-section in the direction of thickness of the support. The present invention covers supports for which this average value is equal to or higher than 10 pieces/100 μm$^2$ and equal to or less than 200 pieces/100 μm$^2$.

Further, to improve electromagnetic characteristics, a dual base (a support comprised of the two layers of the magnetic surface side and the backcoat layer side) is known in which the number of particles of inorganic powder on the magnetic surface side is reduced to smoothen the magnetic surface and the quantity of filler added is increased to improve running properties on the backcoat layer side. Even when a dual base is employed, edge damage due to running depends on the average number of inorganic powder particles in the dual layer cross-section. It is thought that this is caused by that even when the number of inorganic powder particles on the backcoat side is large, edge damage is thought to be reduced through the support of the slit cross-section on the magnetic layer side, which has few inorganic powder particles. The average number of inorganic powder particles in the dual layer cross-section is desirably equal to or less than 200 pieces/100 $\mu m^2$, more preferably equal to or less than 180 pieces/100 $\mu m^2$. Additionally, when the average number of inorganic powder particles in the dual layer cross-section is equal to or less than 10 pieces/100 $\mu m^2$, the sliding property of the support surface is inadequate and handling becomes difficult during production. Thus, the average number of inorganic powder particles in the dual layer cross-section is desirably equal to or higher than 10 pieces/100 $\mu m^2$ and equal to or less than 200 pieces/100 $\mu m^2$.

However, as set forth above, since the phrase "number of inorganic powder particles in the cross-section in the direction of thickness of the support" means the average value of the number of inorganic powder particles throughout the entire cross-section in the direction of thickness of the support, in the case of a dual base, for example, even when the number of inorganic powder particles in the cross-section of one of the layers exceeds 200 pieces/100 $\mu m^2$, or is less than 10 pieces/100 $\mu m^2$, it suffices for the average number of inorganic powder particles in the cross-section of both layers, that 2 is, the dual layers, to be equal to or higher than 10 pieces/100 $\mu m^2$ and equal to or less than 200 pieces/100 $\mu m^2$.

The coercivity Hc of the magnetic layer of magnetic recording medium (1) of the present invention ranges from 159 to 239 KA/m, preferably from 191 to 239 KA/m. By providing a magnetic layer of high coercivity Hc on the above-described nonmagnetic support in this manner, for example, at a thickness equal to or higher than 0.05 $\mu m$ and equal to or less than 0.1 $\mu m$, it is possible to provide a magnetic recording medium that maintains high output and has good durability. One example of a nonmagnetic support in which durability is improved is an aromatic polyamide resin. To achieve high output, it is preferable that a thin magnetic layer with a thickness equal to or higher than 0.05 $\mu m$ and equal to or less than 1.0 $\mu m$ is provided on a lower coated layer as well as the thickness of said layer is equal to or higher than 0.5 $\mu m$ and equal to or less than 2.0 $\mu m$.

Further, the present invention relates to a magnetic recording medium (referred to hereinafter as magnetic recording medium (2)) having on one surface of a nonmagnetic support a lower layer comprising an inorganic powder and a binder and an upper magnetic layer comprising a ferromagnetic powder and a binder in that order, and having on the other surface thereof a backcoat layer, wherein:

said nonmagnetic support comprises inorganic powder particles with a mean primary particle diameter in a range of from 10 to 200 nm;

the number of particles of said inorganic powder in the cross-section of said nonmagnetic support is in the range of from 10 to 200/100 $\mu m^2$, the amount of curl in the direction of width of said magnetic recording medium is equal to or higher than 0.4 mm and equal to or less than 1.0 mm in the direction of protrusion of the magnetic layer at a width of 6.35 mm; and, the overall thickness is equal to or less than 8 $\mu m$.

Specifically, in magnetic recording medium (2) of the present invention, to achieve good repeat running durability despite a total thickness equal to or less than 8 $\mu m$, inorganic powder particles with an average primary particle diameter ranging from 10 to 200 nm (also referred to hereinafter as "fillers") are incorporated into the nonmagnetic support, the number of inorganic powder particles (fillers) as measured by electron microscope in the support surface of the cross-section of the magnetic recording medium (tape) is set to 10 to 200 pieces/100 $\mu m$, and the amount of curl in the direction of width is set to equal to or higher than 0.4 mm and equal to or less than 1.0 mm in the direction of protrusion of the magnetic layer for a width of 6.35 mm.

As a result of detailed observation of effects occurring during repeat running of a tape magnetic recording medium through a magnetic recording and reproducing device, the present inventors learned that deformation of the tape edge was caused by repeated contact between the tape guide flange and the tape edge during repeat running, with the edge of the magnetic layer, support, and backcoat layer being scraped a large number of times, resulting in plastic deformation. In particular, it was thought that the plastic deformation of the support depended on the number of particles that were added, and that through sliding contact with the guide, the filler particles were subjected to a force in the running direction by minute protrusions on the surface of the guide flange, deforming and displacing the support and promoting plastic deformation. Further, dropping out of the filler generated an abrasive effect with the tape guide flange, promoting deformation of the nonmagnetic support.

That is, the present inventors discovered that the lower the number of particles added to the nonmagnetic support, the more deformation of the edge of the nonmagnetic support could be prevented.

However, when the quantity of filler added was excessively small, suitability to production of the nonmagnetic support and suitability to production of the magnetic recording medium were compromised; thus, optimization was required.

The present inventors discovered that the average primary particle diameter of filler dispersed in the support optimally ranged from 10 to 200 nm, preferably from 40 to 200 nm, more preferably from 40 to 120 nm; and that the number of filler particles in the support surface in the tape cross-section optimally ranged from 10 to 200/100 $\mu m^2$, preferably from 20 to 200 pieces/100 $\mu m^2$, more preferably from 30 to 180 pieces/100 $\mu m^2$. The phrase "number of filler particles" employed above means the average value of the number of inorganic powder particles throughout the entire direction of thickness of the cross-section in the direction of thickness of the support, and includes cases where the average value ranges from 10 pieces/100 $\mu m^2$ to 200 pieces/100 $m^2$. Accordingly, for example, in a dual base consisting of a two-layer configuration, even when one of the layers has a quantity of filler particles exceeding 200 pieces/100 $m^2$ and the other layer has a quantity of filler particles of less than 10 pieces/100 $\mu m^2$, it suffices for the average value of the number of particles in the entire direction of thickness of the nonmagnetic support to fall within the range of from 10 pieces/100 $\mu m^2$ to 200 pieces/100 $\mu m^2$.

Further, the nonmagnetic support is convex to the extent that the center of the magnetic layer side swells in the tape width direction and rubbing of tape edge during running is alleviated by contact between the edge of the tape and the flange of the tape guide or the flange of the tape reel in the tape running system and the like due to that the height for 6.35 mm width height (also referred to hereinafter as the amount of capping) ranges from 0.4 to 1.0 mm. Thus, the amount of powder falling out due to shaving of the edge of the tape during fast forwarding and rewinding in particular is reduced, sullying of the running system is reduced, and it is possible for the tape to be wound on the tape reel without protrusion of tape edges and in well-aligned fashion. Even were an edge to stick out, that edge would be subjected to little physical deformation. When the amount of capping becomes smaller than 0.4 mm, the amount of powder falling out becomes larger due to the falling out of the magnetic layer at the edge of the tape, and when the amount of capping becomes larger exceeding 1.0 mm, the amount of powder falling out becomes larger due to falling out of the backcoat layer at the edge of the tape; neither is desirable.

Further, in magnetic recording medium (2) of the present invention, thermal shrinkage in the MD direction during storage for one week with a load of 0.1 N in an environment of 60° C. and 90 percent is desirably equal to or less than 0.3 percent to ensure good dimensional stability. Thus, it is possible to prevent Z Error Rate (BER) deterioration due to tape deformation on the reel core side during long-term storage of the cassette.

Further, in magnetic recording medium (2) of the present invention, the coercivity of the magnetic layer is desirably set to equal to or higher than 159 KA/m, preferably equal to or less than 237 KA/m, to achieve high density recording and high density output.

The coercivity Hc of the magnetic material of magnetic recording medium (2) of the present invention is equal to or higher than 79 KA/m and equal to or less than 316 KA/m, preferably equal to or higher than 158 KA/m and equal to or less than 237 KA/m.

To achieve higher output, the magnetic layer provided on the lower layer is preferably a thin magnetic layer equal to or higher than 0.05 $\mu$m and equal to or less than 1.0 $\mu$m in thickness and the lower layer is preferably equal to or higher than 0.5 $\mu$m and equal to or less than 2.0 $\mu$m in thickness. A magnetic material having the above-stated coercivity Hc is mixed with and dispersed in a binder, a magnetic solution is prepared and dispersed, and a thin magnetic layer equal to or higher than 0.05 $\mu$m and equal to or less than 0.1 $\mu$m in thickness is coated on a support with improved durability to provide a magnetic recording medium having good durability in which high output is maintained.

Further, in magnetic recording medium (2) of the present invention, the nonmagnetic support is preferably an aromatic polyamide resin, especially comprised of an aramid having a breaking strength ranging from 10 to 20 percent.

Detailed Explanation of the Invention

The magnetic recording medium of the present invention is a magnetic recording medium in which a magnetic layer comprising a ferromagnetic powder dispersed in a binder is provided on a nonmagnetic support. The nonmagnetic support may comprise equal to or higher than 50 molar percent of an aromatic polyamide resin, examples of which are given by:

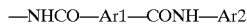
—NHCO—Ar1—CONH—Ar2

(wherein Ar1 and Ar2 denote bivalent organic groups comprising at least one aromatic ring, preferably having 6 to 25 carbon atoms) and,

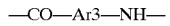
—CO—Ar3—NH—

(wherein Ar3 denotes a bivalent organic group comprising at least one aromatic ring, preferably having 6 to 25 carbon atoms). Examples of aromatic polyamide resins are paraphenilene terephthalamide, paraphenilene isophthalamide, metaphenilene terephthalamide, and metaphenyl isopthalamide.

Further, included are those having a phenyl nucleus of the aromatic ring comprising a substituent such as a nitro group, alkyl group, or alkoxy group. Aromatic polyamides comprised chiefly of paraphenilene terephthalamide are preferred; they are good materials for high-density recording media having good mechanical strength, a high modulus of elasticity, a low coefficient of moisture absorption, further, good heat resistance, and good mechanical and thermal dimensional stability.

Examples of monomers comprising aromatic polyamides of the above-described structure are acid chlorides such as terephthalic chloride and diamines such as paraphenilene diamine and metaphenilene diamine.

Such aromatic polyamides are described in U.S. Pat. No. 2,628,898, for example. Examples of aromatic polyamides that are readily commercially available are Armica (from Asahi Kasei Corporation) and Mictron (from Toray Industries, Inc.).

The thickness of the aromatic polyamide film employed in the present invention generally ranges from 1.0 to 7.0 $\mu$m, preferably from 2.0 to 6.0 $\mu$m, and more preferably from 3.0 to 5.0 $\mu$m.

Further, the total thickness of the magnetic recording medium of the present invention is suitably equal to or higher than 2 $\mu$m but less than 8 $\mu$m, preferably equal to or higher than 2 $\mu$m but less than 6.8 $\mu$m from the perspective of achieving high density and reducing thickness with an aramid film.

The inorganic powder (filler) particles may be selected from among spherical silica, colloidal silica, titanium oxide, and the like. The mean primary particle diameter ranges from 40 to 200 nm, preferably from 40 to 180 nm. Further, to control the surface properties of the magnetic layer surface side and the backcoat layer surface side, two types of dopes having different quantities of inorganic powder (filler) particles added may be prepared and casting conducted with a specialized die capable of simultaneously applying two solutions in multiple layers to obtain multi-layered films with differing properties on the front and back surfaces.

In magnetic recording medium (1), the size of the inorganic powder particles (filler) comprising the support is preferably regulated to the extent possible. For example, particles where the cumulative number of particles up to twice the mean particle size constitutes equal to or higher than 90 percent of the total number of particles are preferred.

In magnetic recording medium (2), it is possible to impart capping to the film itself through film drying conditions. The filler contained in the support of magnetic recording medium (2) is preferably uniformly dispersed to the extent possible in the form of primary particles.

[The Magnetic Layer]

A ferromagnetic powder is dispersed in a binder in the magnetic layer of the magnetic recording medium of the present invention. The ferromagnetic powder employed may be a ferromagnetic iron oxide, cobalt-containing ferromagnetic iron oxide, barium-ferrite powder, ferromagnetic metal powder, or the like.

The SBET (BET specific surface area) of the ferromagnetic powder ranges from 40 to 80 m$^2$/g, preferably from 50 to 70 m$^2$/g. The crystalline size ranges from 12 to 25 nm, preferably from 13 to 22 nm, and more preferably from 14 to 20 nm. The major axis length ranges from 0.05 to 0.25 $\mu$m, preferably from 0.07 to 0.2 $\mu$m, and more preferably from 0.08 to 0.15 $\mu$m. The pH of the ferromagnetic powder is preferably equal to or higher than 7. Single metals and alloys such as Fe, Ni, Fe—Co, Fe—Ni, Co—Ni, and Co—Ni—Fe are examples of ferromagnetic metal powders. Aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, bismuth, and the like may be incorporated in a range not exceeding 20 weight percent of the metal component.

Further, it is preferable that the magnetic powder comprises 10 to 40 atomic percent of Co, 2 to 20 atomic percent of Al and 1 to 15 atomic percent of Y relative to Fe, such as is described in Japanese Unexamined Patent Publication (KOKAI) Heisei No. 8-255334, for example, from the viewpoint of reducing sintering and providing excellent dispersibility. Further, the ferromagnetic metal powder may comprise small quantities of water, hydroxides, or oxides.

Further, the ferromagnetic powder employed in the magnetic layer of magnetic recording medium (1) of the present invention desirably has a coercivity ranging from 150 to 220 KA/m and a σS ranging from 1.26 to 2.26×10$^{-4}$ Wb·m/kg to reduce recording demagnetization loss and prevent a reduction in magnetization level due to thermal fluctuation. Further, the SSA of the ferromagnetic powder desirably ranges from 35 to 60 m$^2$/g from the perspective of achieving suitable dispersion solution viscosity and compatibility with the binder.

Further, the ferromagnetic powder employed in the magnetic layer of magnetic recording medium (2) of the present invention preferably has a major axis length, chiefly of Fe, of from 0.05 to 0.19 μm and the crystalline size thereof desirably ranges from 100 to 230 A from the perspective of lowering noise along with increasing the magnetic powder fill rate. Further, the ferromagnetic powder employed in the magnetic layer of magnetic recording medium (2) of the present invention desirably has a coercivity ranging from 79 to 316 KA/m and an a S ranging from 1.26 to 2.26×10$^{-4}$ Wb·m/kg to reduce recording demagnetization losses and to prevent a reduction in magnetization level due to thermal fluctuation. Further, the SSA of the ferromagnetic powder desirably ranges from 35 to 60 m$^2$/g from the perspective of achieving suitable dispersion solution viscosity compatibility with the binder.

Methods of manufacturing these ferromagnetic powders are known, and known methods may be employed to manufacture the ferromagnetic powder employed in the present invention.

Although the shape of the ferromagnetic powder is not specifically limited, ferromagnetic powders that are acicular, granular, cubic, rice-particle shaped (also referred to as "spindle shaped"), or tabular(or plate-shaped) are generally employed. In particular, acicular and spindle-shaped ferromagnetic powders are employed with preference.

Further, the nonmagnetic support is convex to the extent that the center of the magnetic layer side swells in the tape width direction and rubbing of tape edge during running is alleviated by contact between the edge of the tape and the flange of the tape guide or the flange of the tape reel in the tape running system and the like due to that the height for 6.35 mm width height (also referred to hereinafter as the amount of capping or curl d) ranges from 0.4 to 1.0 mm. Thus, the amount of powder falling out due to shaving of the edge of the tape during fast forwarding and rewinding in particular is reduced, sullying of the running system is reduced, and it is possible for the tape to be wound on the tape reel without protrusion of tape edges and in well-aligned fashion. Even were an edge to stick out, that edge would be subjected to little physical deformation. When the amount of capping becomes smaller than 0.4 mm, the amount of powder falling out becomes larger due to the falling out of the magnetic layer at the edge of the tape, and when the amount of capping becomes larger exceeding 1.0 mm, the amount of powder falling out becomes larger due to falling out of the backcoat layer at the edge of the tape; neither is desirable.

Conventionally known thermoplastic resins, thermosetting resins, reactive resins, and the like may be employed as binders in the magnetic layer of the magnetic recording medium of the present invention. Preferred binders are vinyl chloride resin, vinyl chloride—vinyl acetate resin, nitrocellulose and other cellulose resins, phenoxy resins, and polyurethane resins. Of these, the use of vinyl chloride resin, vinyl chloride—vinyl acetate resin, or a polyurethane resin is preferred because it imparts a hardness to the backcoat layer close to that of the magnetic layer, permitting a reduction in back transfer. Further, employing polyurethane resin comprising a ring structure and an ether group as a portion of the binder is desirable from the perspective of increasing dispersibility.

Binders of particular preference are polyurethane resins obtained by reacting a diol and organic diisocyanate. Based on the polyurethane resin, the diol is comprised of 17 to 40 weight percent of a short-chain diol having a ring structure and 10 to 50 weight percent of a long-chain diol having an ether bond. The diol further comprises 1.0 to 5.0 mol/g of ether bonds in the long-chain diol based on the polyurethane resin. The Tg ranges from −20 to 150° C., preferably from 20 to 120° C., and more preferably from 50 to 100° C.

Even when the cyclic portion of the long-chain diol is either aliphatic or aromatic, it is preferable that the Tg of the coating film is optimized so that the coating Tg ranges from 50 to 150° C., preferably from 70 to 100° C., and the calendering temperature ±30° C.=coating film Tg and the binder composition is also adjusted so that both calendering forming properties and coating film strength are achieved.

The binder is usually cured with a common polyisocyanate curing agent. The curing agent is employed in a proportion of from 0 to 150 weight parts, preferably from 0 to 100 weight parts, and more preferably from 0 to 50 weight parts, per 100 weight parts of polyurethane resin.

The content of hydroxyl groups in the polyurethane resin desirably ranges from 3 to 20 pieces per molecule, more preferably from 4 to 5 pieces per molecule. When there are equal to or higher than 3 pieces per molecule, the reaction with the polyisocyanate curing agent progresses well, yielding both good coating film strength and durability. When equal to or less than 20 pieces, neither solubility nor dispersibility in solvents decrease.

A compound having three or more functional groups in the form of hydroxyl groups may be employed to adjust the content of hydroxyl groups in the polyurethane resin. Specific examples are trimethylolethane, trimethylolpropane, trimellitic anhydride, glycerin, pentaerythritol, hexanetriol, the branching polyester having a dibasic acid obtained from a starting material in the form of a polyester polyol described in Japanese Examined Patent Publication (KOKOKU) Heisei No. 6-64726 and a trifunctional or more hydroxyl group obtained from said component as a glycol component, and polyetheresters. Trifunctional compounds are preferred; compounds that are tetrafunctional or greater tend to gel during the reaction.

The polyurethane resin desirably comprises in the molecule at least one polar group selected from —SO$_3$M, —OSO$_3$M, —COOM, —PO$_3$MM', —OPO$_3$MM', —NRR', and —N$^+$RR'R"COO— (where M and M' each independently denote a hydrogen atom, alkali metal, alkaline earth metal, or ammonium salt and R, R', and R" each independently denote an alkyl group with 1 to 12 carbon atoms), with —$SO_3M$ and —$OSO_3M$ being particularly preferred. The quantity of these polar groups ranges from $1\times10^{-5}$ to $2\times10^{-4}$ eq/g, preferably from $5\times10^{-5}$ to $1\times10^{-4}$ eq/g. At $1\times10^{-5}$ eq/g or greater, adsorption onto the powder is adequate and dispersibility is good, while at $2\times10^{-4}$ eq/g or less, both solubility and dispersibility in the solvent are good.

The number average molecular weight (Mn) of the polyurethane resin preferably ranges from 5,000 to 100,000, more preferably from 10,000 to 50,000, and still more preferably from 20,000 to 40,000. At 5,000 and above, the coating film has good strength and durability, and at 100,000 or less, solubility and dispersibility in the solvent are good.

The cyclic structure of polyurethane resin affects rigidity, with the ether group contributing to flexibility. The above-mentioned polyurethane resin is highly soluble, has a high inertial radius (molecular spread), and good dispersibility in powder. Further, polyurethane resin itself is characterized by both hardness (high Tg, high Young's modulus) and toughness (elongation).

In addition to the above-described components, the coating material used to form the magnetic layer may also comprise abrasives such as $\alpha$—$Al_2O_3$ and $Cr_2O_3$; antistatic agents such as carbon black; lubricants such as fatty acid esters and silicone oils; dispersants; and other commonly employed additives and fillers.

The magnetic layer of magnetic recording medium (2) of the present invention desirably has a Tg equal to or higher than 30° C. and equal to or less than 150° C. from the perspective of increasing running durability. Further, the thickness of the magnetic layer in magnetic recording medium (2) ranges from 0.03 to 1.0 μm, preferably from 0.05 to 0.5 μm, and more preferably from 0.05 to 0.3 μm from the perspective of increasing digital recording performance. Further, the magnetic recording medium of the present invention desirably has a squareness equal to or higher than 0.82 and an SFD equal to or less than 0.5 from the perspective of achieving high output and high erasure characteristics.

[The Lower Layer (Nonmagnetic Layer)]

The magnetic recording medium of the present invention comprises a nonmagnetic layer comprising a nonmagnetic inorganic powder and a binder between the support (preferably consisting of an aromatic polyamide film). The nonmagnetic inorganic powder in the nonmagnetic layer may be selected from among inorganic compounds and nonmagnetic metals such as metal oxides, metal carbonates, metal sulfates, metal nitrates, metal carbides, and metal sulfides. Examples of inorganic compounds are titanium oxides ($TiO_2$ and TiO), $\alpha$-alumina having an $\alpha$-conversion rate ranging from 90 to 100 percent, $\beta$-alumina, $\gamma$-alumina, $\alpha$-iron oxide, chromium oxide, zinc oxide, tin oxide, tungsten oxide, vanadium oxide, silicon carbide, cerium oxide, corundum, silicon nitride, titanium carbide, silicon dioxide, magnesium oxide, zirconium oxide, boron nitride, calcium carbonate, calcium sulfate, barium sulfate, molybdenum disulfate, gercite, aluminum hydroxide; these may be employed singly or in combination. Particularly preferred are titanium dioxide, zinc oxide, iron oxide, and barium sulfate. Even more preferred are titanium dioxide and iron oxide. Examples of nonmagnetic metals are Cu, Ti, Zn, and Al. The mean particle diameter of these nonmagnetic powders desirably ranges from 0.005 to 2 μm. Nonmagnetic powders of differing mean particle diameters may be combined as needed, and an identical effect may be achieved by employing a single nonmagnetic powder with a wide particle diameter distribution. What is preferred most is a nonmagnetic powder with a mean particle diameter ranging from 0.01 to 0.2 μm. A pH of from 6 to 9 is particularly desirable in the nonmagnetic powder. The specific surface area of the nonmagnetic powder ranges from 1 to 100 m$^2$/g, preferably from 5 to 50 m$^2$/g, still more preferably from 7 to 40 m$^2$/g. The crystalline size of the nonmagnetic powder desirably ranges from 0.01 to 2 μm. The DBP oil absorption amount ranges from 5 to 100 mL/100 g, preferably from 10 to 80 mL/100 g, and still more preferably from 20 to 60 mL/100 g. The specific gravity ranges from 1 to 12, preferably from 3 to 6. The shape may be acicular, spindle-like, spherical, polyhedral, or tabular (or plate-shaped).

The binders, lubricants, dispersing agents, additives, solvents, dispersing methods, and the like described above for the magnetic layer may be suitably employed in the nonmagnetic layer. Particularly as regards the quantity and type of binder, additives, and dispersing agents, methods known for use in the magnetic layer may be employed.

Examples of the thicknesses of the various layers in magnetic recording medium (1) of the present invention are: when the support is 4.0 μm in thickness, for example, the magnetic layer may range from 0.03 to 0.5 μm, preferably from 0.05 to 0.5, and more preferably from 0.08 to 0.3 μm, and the nonmagnetic layer may range from 0.1 to 2 μm, preferably from 0.5 to 2 μm, and more preferably from 0.8 to 2 μm. The nonmagnetic layer is preferably thicker than the magnetic layer.

In the magnetic recording medium (2) of the present invention, the magnetic layer may range from 0.03 to 1 μm, preferably from 0.05 to 0.5 μm, and more preferably from 0.05 to 0.3 μm in thickness, for example, and the lower layer (nonmagnetic layer) may range from 0.1 to 3 μm, preferably from 0.5 to 2 μm, and more preferably from 0.8 to 1.5 μm in thickness. The thickness of the nonmagnetic layer is preferably greater than the thickness of the magnetic layer in magnetic recording medium (2). Further, it is also desirable in magnetic recording medium (2) for the magnetic layer to comprise two magnetic layers. In that case, the upper layer may be made to range from 0.2 to 2 μm, preferably from 0.2 to 1.5 μm in thickness, for example, and the lower layer may be made to range from 0.5 to 1.5 μm. Employing a lower thickness in the lower layer makes it possible to achieve a level of capping in the protruding of magnetic layer that falls within the range of the present invention.

[The Backcoat Layer]

The thickness of the backcoat layer that is formed in magnetic recording medium (1) of the present invention is desirably set to within a range of from 0.05 to 1.0 μm. Within that range, a range of from 0.1 to 0.8 μm is preferred.

The thickness of the backcoat layer that is formed in magnetic recording medium (2) of the present invention is desirably set to within a range of from 0.05 to 1.0 μm. A range of from 0.2 to 0.8 μm is preferred, and from 0.3 to 0.8 μm is even more preferred. In magnetic recording medium (2), the thickness of the backcoat layer may be used to control capping of the protruding of magnetic layer. Thus, a thicker magnetic layer is desirable.

Granular oxides are desirably employed in the backcoat layer. Examples of granular oxides that are suitable for use are $\alpha$—$Al_2O_3$, titanium oxide, $\alpha$-iron oxide, and mixtures thereof. Commonly employed $\alpha$—$Al_2O_3$, titanium oxides, and $\alpha$-iron oxides may be employed. Further, the shape of the particles is not specifically limited. When spherical, particles with a particle diameter of from 0.01 to 0.1 μm are preferably employed, and when acicular, particles with an acicular ratio of from 2 to 20 and a major axis length of from 0.05 to 0.3 μm are preferably employed. At least a portion of the surface of the granular oxides may be varied to another compound, or coated with another compound such as $Al_2O_3$, $SiO_2$, or $ZrO_2$.

Carbon black is desirably employed in the backcoat layer as an antistatic agent. The carbon blacks that are commonly employed in magnetic recording tapes may be widely employed in the backcoat layer. Examples that are suitable for use are furnace black for rubber, thermal black for rubber, black for coloring, and acetylene black. To prevent irregularities in the backcoat layer from being transferred to the magnetic layer, the particle diameter of the carbon black is preferably equal to or less than 0.3 μm. A particularly desirable particle diameter ranges from 0.01 to 0.1 μm. The quantity of carbon black employed in the backcoat layer is preferably one yielding an optical transmission power (the transmission value of the TR-927 made by Magness Co.) equal to or less than 2.0.

To increase running durability, it is advantageous to employ two type of carbon black having different mean particle sizes in the backcoat layer. In that case, the combination of a first type of carbon black having a mean particle size of from 0.01 to 0.04 μm and a second type of carbon black having a mean particle size of from 0.05 to 0.3 μm is desirable. A suitable content of the second type of carbon black is from 0.1 to 10 weight parts, preferably from 0.3 to 3 weight parts, per 100 weight parts of the granular oxide and first type of carbon black combined.

The ratio by weight of the granular oxide to carbon black is from 60/40 to 90/10, preferably from 70/30 to 80/20. Employing the granular oxide in greater quantity than the carbon black permits the formation of a backcoat layer with good powder dispersion properties and a smooth surface. A backcoat layer coating material having such a composition has greater thixotropic properties than a conventional backcoat layer coating material comprised chiefly of carbon black. Thus, it becomes possible to coat at high concentration using extrusion methods and gravure methods. The application of such high-concentration coating materials permits the formation of a backcoat layer adhering with significant adhesive strength to the support and having high mechanical strength despite a low film thickness.

The quantity of binder employed may be selected from a range of from 10 to 40, preferably from 20 to 32 weight parts per 100 weight parts of granular oxide and carbon black combined. The film strength is high and surface resistivity is low in the backcoat layer thus formed.

Conventionally known thermoplastic resins, thermosetting resins, and reactive resins may be employed as the backcoat layer binder.

Magnetic recording medium (1) of the present invention broadly covers magnetic recording media having a magnetic layer over a nonmagnetic layer comprising a nonmagnetic powder on one of the surfaces of an aromatic polyamide film, and a backcoat layer provided on the reverse surface from the magnetic layer. Magnetic recording medium (1) of the present invention also covers magnetic recording media having layers other than the stated layers. For example, a soft magnetic layer comprising a soft magnetic powder, a second magnetic layer, a cushion layer, an overcoat layer, an adhesive layer, and a protective layer may be present. These layers may be suitably positioned so as to effectively perform their functions.

In addition to a magnetic layer, a nonmagnetic layer, and/or a backcoat layer, magnetic recording medium (2) of the present invention may also comprise a soft magnetic layer comprising a soft magnetic powder, a second magnetic layer, a cushion layer, an overcoat layer, an adhesive layer, and a protective layer. These layers may be suitably positioned so as to effectively perform their functions.

The magnetic recording medium of the present invention may be manufactured by the application of a coating material on the surface of nonmagnetic support under running so as to yield dry film thicknesses falling within the above-prescribed ranges, for example. Multiple magnetic coating materials and nonmagnetic coating materials may be sequentially or simultaneously applied in multiple layers. Coating machines suitable for use in applying the magnetic coating material are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center (K.K.) may be referred to in this regard.

The following are examples of methods suitable for use when manufacturing magnetic recording tape having a magnetic layer and lower layer (nonmagnetic layer) on one side of a support in the present invention:

1. The lower layer is first applied with a coating device commonly employed to apply magnetic coating solutions such as a gravure coating, roll coating, blade coating, or extrusion coating device, and the upper layer is applied while the lower layer is still wet by means of a support pressure extrusion coating device such as is disclosed in Japanese Examined Patent Publication (KOKAI) Heisei No. 1-46186 and Japanese Unexamined Patent Publication (KOKAI) Showa No. 60-238179 and Japanese Unexamined Patent Publication (KOKAI) Heisei No. 2-265672.

2. The upper and lower layers are applied nearly simultaneously, for example, by a single coating head having two built-in slits for passing coating solution, such as is disclosed in Japanese Unexamined Patent Publication (KOKAI) Showa No. 63-88080, Japanese Unexamined Patent Publication (KOKAI) Heisei Nos. 2-17971 and 2-265672.

3. The upper and lower layers are applied nearly simultaneously using, for example, an extrusion coating apparatus with a backup roller as disclosed in Japanese Unexamined Patent Publication (KOKAI) Heisei No. 2-174965.

The backcoat layer can be prepared by applying a backcoat layer coating material in which granular components such as abrasives, antistatic agents, and the like are dispersed in an organic solvent on the reverse surface from the magnetic layer. As set forth in the above-described preferred modes, adequate dispersibility can be ensured by employing a larger quantity of granular compounds than carbon black. Thus, preparation of the backcoat layer coating material can be accomplished without the conventionally required roll kneading. Further, even when cyclohexanone is employed as solvent, the quantity of residual cyclohexanone following drying may be reduced by lowering the carbon black content.

The coated magnetic layer is dried after magnetically orienting the ferromagnetic powder contained in the magnetic layer. Magnetic orientation may be suitably conducted by methods known to those skilled in the art. Capping of the protruding of magnetic layer may be increased even when the drying temperature of the magnetic layer is high.

The magnetic layer is processed to smooth the surface thereof with a super calender roll or the like after drying. Surface smoothing eliminates holes generated by removal of the solvent during drying and improves the fill rate of ferromagnetic powder in the magnetic layer. It is thus possible to obtain a magnetic recording tape with good electromagnetic characteristics.

Heat-resistant plastic rolls of epoxy, polyimide, polyamide, polyamidoimide, or the like may be employed as the calender processing rolls. Processing may also be conducted with metal rolls.

The magnetic recording medium of the present invention preferably has a highly smooth surface. Such a highly smooth surface may be effectively obtained by selecting a special binder such as those described above and subjecting the magnetic layer that has been formed to the above-described calendering process. Processing by calender is conducted at a calender roll temperature ranging from 60 to 100° C., preferably from 70 to 100° C., and more preferably from 80 to 100° C. and at a pressure ranging from 100 to 500 kg/cm, preferably from 200 to 450 kg/cm, and still more preferably from 300 to 400 kg/cm. The magnetic recording tape obtained is cut to desired size with a cutting unit or the like for use. The calendered magnetic recording tape is commonly heat treated to reduce the amount of thermal shrinkage.

[Embodiments]

The present invention is described below through embodiments.

[Embodiment of Magnetic Recording Medium (1)]
<Method of Forming Magnetic Tape>

| Magnetic Layer    Embodiment 1 | |
|---|---|
| Ferromagnetic metal micropowder | 100 parts |
| Composition Fe/Co = 100/30 (atomic ratio) | |
| Hc | 187 KA/m |
| BET specific surface area | 49 m²/g |
| Crystalline size | 16 nm |
| Al/Fe = 13 atomic percent, Y/Fe = 7 atomic percent | |
| Particle size (major axis diameter) | 0.09 µm |
| Acicular ratio | 7 |
| σ S: 145 A · m²/kg (1.82 × 10⁻⁴ Wb · kg) | |
| Vinyl chloride copolymer | 10 parts |
| MR-110 from Nippon Zeon Co.,Ltd. | |
| Polyurethane resin | 6 parts |
| Hydrogenated bisphenol A | |
| Molar ratio 0.6 | |
| Polypropylene oxide adduct of bisphenol A | |
| Molar ratio 0.3 | |
| Sulfoisophthalic acid ethylene oxide adduct | |
| Molar ratio 0.05 | |
| Diphenylmethane isocyanate | |
| Molar ratio 1.0 | |
| Trimethylolpropane | |
| Molar ratio 0.05 | |
| Urethane group concentration | 4.0 meq/g |
| Ether group concentration | 5.0 meq/g |
| Molecular weight (number average) | 25,000 |
| α-Al₂O₃ (mean particle diameter 0.15 µm) | 5 parts |
| Carbon black (mean particle diameter 0.08 µm) | 0.5 part |
| Butyl stearate | 1 part |
| Stearic acid | 5 parts |
| Methyl ethyl ketone | 90 parts |
| Cyclohexanone | 30 parts |
| Toluene | 60 parts |
| Lower Coated Layer (Nonmagnetic) | |
| Nonmagnetic powder α-Fe₂O₃ hematite | 80 parts |
| P/Fe = 1.3 atomic percent | |
| Al/Fe = 6.0 atomic percent | |
| Si/Fe = 7.0 atomic percent | |
| Major axis length | 0.15 µm |
| BET specific surface area | 52 m²/g |
| pH | 8 |
| Tap density | 0.8 |
| DBP oil absorption amount | 27–38 g/100 g |
| Carbon black | 20 parts |
| Mean primary particle diameter | 16 nm (16 mµ) |
| DBP oil absorption amount | 80 mL/100 g |
| pH | 8.0 |
| BET specific surface area | 250 m²/g |
| Volatile components | 1.5 percent |
| Vinyl chloride copolymer | 12 parts |
| MR-110 from Nippon Zeon Co., Ltd. | |
| Polyester polyurethane resin | 5 parts |
| Hydrogenated bisphenol A | |
| Molar ratio 0.6 | |
| Polypropylene oxide adduct of bisphenol A | |
| Molar ratio 0.3 | |
| Sulfoisophthalic acid ethylene oxide adduct | |
| Molar ratio 0.05 | |
| Diphenylmethane isocyanate | |
| Molar ratio 1.0 | |
| Trimethylolpropane | |
| Molar ratio 0.05 | |
| Urethane group concentration | 4.0 meq/g |
| Ether group concentration | 5.0 meq/g |
| Molecular weight (number average) | 25,000 |
| α-Al₂O₃ (mean particle diameter 0.3 µm) | 1 part |
| Butyl stearate | 1 part |
| Stearic acid | 1 part |
| Methyl ethyl ketone | 100 parts |
| Cyclohexanone | 50 parts |
| Toluene | 50 parts |

Each of the components of the above-described coating materials was kneaded in an open kneader and then dispersed with a sand mill. To the lower layer dispersing solution, 5 parts of polyisocyanate (Coronate L from Nippon Polyurethane Industry Co., Ltd.) were added to the coating solution for the lower coated layer, after which 40 parts of a mixed solvent of methyl ethyl ketone and cyclohexanone were added to each of the solutions. The solutions were then passed through a filter having an average pore size of 1 µm to complete preparation of each of the lower layer coating solution and magnetic layer coating solution.

Simultaneous multilayer coating was performed in which, on a polyamide resin support (prepared by a method described further below) 4.5 µm in thickness and having a centerline average surface roughness for magnetic layer coated surfaces of 0.001 µm, the coating solution for the lower layer was applied so as to eventually yield a dry thickness of 1.3 µm, and immediately after this application a magnetic layer was applied thereover to a thickness of 0.25 µm. While both layers were still wet, orientation was conducted with a rare earth magnet having a magnetic force of 5,000 G (500 mT) and a solenoid having a magnetic force of 4,000 G (400 mT), and the layers were dried. They were then processed with a seven-stage calender comprising metal rollers and epoxy rollers at a temperature of 100° C. at a rate of 200 m/min. Subsequently, a backcoat layer was applied to a thickness of 0.5 µm. Slits 6.35 mm in width were then formed to complete a 123-minute DVCPRO tape. The results of the measurement of the physical properties thereof are given in Table 1.

The polyamide resin support (aramid) employed as the nonmagnetic support was prepared by the following known method.

PPTA polymer having an η inh (logarithmic viscosity) of 5.5 was dissolved to a polymer concentration of 11.5 percent in concentrated sulfuric acid comprising 0.005 weight percent of colloidal silica with a mean particle diameter of 80 nm. While maintaining the dope at about 70° C., it was degassed under vacuum. The dope was cast onto a belt (moving at 12 m/min) of tantalum polished to a mirror finish at a discharge linear velocity of 3.5 m/min from a die having slits measuring 0.15 mm×300 mm, roughly 90° C. air having a relative humidity of about 85 percent was blown, and the flowing dope was rendered optically isotropic. Together with the belt, the dope was directed into a −5° C., 15 weight percent sulfuric acid aqueous solution and solidified. The solidified film was then stripped off the belt and cleaned by passing it through roughly 40° C. warm water, a 1 percent aqueous solution of sodium carbonate, and then 25° C. water. The cleaned film, having a water content of about 280 percent, was first uniaxially extended to about 1.2-fold in the lengthwise (MD) direction at room temperature by exploiting the peripheral velocity differential of rollers, and then introduced into a tenter, extended to about 1.2-fold in the crosswise direction (TD) near the inlet, dried to fixed length at 150° C. near the center, and heat treated at 400° C. by exposure to an infrared lamp near the tenter outlet. The lengthwise film was then wound. The PPTA film obtained had good transparency and a thickness of 4.0 µm.

<Magnetic Characteristics>

Magnetic characteristics were measured at an applied magnetic field of 796 A/m (10 kOe) with a vibrating sample magnetometer VSM-P7 from Toei Kogyo Co., Ltd. and a data processor from the same firm.

<Thickness of Magnetic Layer and Lower layer>

The thickness of the magnetic layer was obtained by observing and photographing ultrathin sections under a transmission electron microscope and correcting for photographic magnification.

<Total Tape Thickness>

A macrometer with a precision of 1 µm was employed to measure the thickness of ten stacked sheets of tape and the value obtained was divided by ten to determine the thickness of a single sheet <Reproduction Output>

An AJ-D750 commercial digital VTR (DVCPRO) (made by Matsushita Electric Industry Co., Ltd.) was employed to observe data output waveforms at 25° C. and 60 percent RH. These were compared to those of a reference tape (DP121-66M) made by Fuji Photo Film Co., Ltd. and the spot of lowest output was taken as the reproduction output. The target was at least −3 dB.

<Full-Length Running>

An AJ-D750 commercial digital VTR (DVCPRO) (made by Matsushita Electric Industry Co., Ltd.) was employed to repeatedly reproduce and rewind 100 times at 5° C. and 80 percent RH. The number of instantaneous clogs in the first pass with the highest number of instantaneous clogs (equal to or higher than 120 µsec; −3 dB) among 100 passes was recorded. Ten clogs or fewer was acceptable.

Further, the amount of improper winding was evaluated along with full-length running. Before commencing full-length running, 380 m was wound on a supply reel and the diameter of the windings was measured. The full length was then recorded, and after 100 reproduction runs (playing and rewinding), it was rewound on the supply reel and the winding diameter was then measured again. The increase in winding diameter before and after running was taken as the amount of improper winding. An amount of improper winding h equal to or less than 0.4 mm was desired from a practical viewpoint.

<Winding Stiffness>

Winding stiffness was defined as the pullout torque of the tape when the supply reel was secured after the above-described 100 passes of full-length running. The pullout torque was the peak torque required to pull the tape out to a length of 30 mm when the supply reel was secured to a movable stress-strain gauge, the unwound tape was mounted on the stress-strain gauge, and recording was conducted on a recorder through an amplifier during operation. A winding stiffness equal to or higher than 0.5 N was desirable.

<Number of Fillers>

Small sections of magnetic tape were embedded in epoxy resin adhesive, the front ends of the embedded blocks were formed into suitable sizes and shapes, a microtome was employed to cut out cross-sections, and observation samples were prepared. The cross-section samples prepared were photographed at a magnification of 20,000 with a model FE-SEM S-800 scanning electron microscope from Hitachi, Ltd. and the number of particles of filler in the nonmagnetic support was counted.

Embodiment 2 and

COMPARATIVE EXAMPLE 1

In Embodiment 2, the concentration prior to dissolution in concentrated sulfuric acid in Embodiment 1 was increased to 0.035 weight percent. In Comparative Example 1, the concentration was further increased to 0.070 weight percent. The magnetic layer, lower layer, and backcoat layer were identical to those in Embodiment 1. The results of measurement of individual physical properties are given in Table 1.

Table 1 below reveals that when the amount of filler in the cross-section of the nonmagnetic support was increased, improper winding increased and loose winding resulted.

TABLE 1

|  |  | Embodiment 1 | Embodiment 2 | Comp. Ex. 1 |
| --- | --- | --- | --- | --- |
| Magnetic layer Hc | Hc KA/m | 193 | 194 | 194 |
| Upper layer thickness | µm | 0.26 | 0.24 | 0.26 |
| Lower layer thickness | µm | 1.22 | 1.22 | 1.24 |
| Total thickness | µm | 6.2 | 6.3 | 6.2 |
| Nonmagnetic support | material | aramid | aramid | aramid |
| Layer structure thickness | µm | single layer 4.0 | single layer 4.0 | single layer 4.0 |
| Thickness of magnetic layer side | µm | — | — | — |
| Thickness of backcoat side | µm | — | — | — |
| Filler particle diameter | nm | 80 | 80 | 80 |
| Filler concentration prior to dissolution in concentrated sulfuric acid | weight percent | 0.005 | 0.035 | 0.070 |
| Number of fillers | no. per 100 µm$^2$ | 18 | 190 | 450 |
| Initial output | dB | −0.3 | −0.5 | −0.6 |
| Instantaneous clogging | no. per 123 min | 0 | 1 | 1 |

TABLE 1-continued

|  |  | Embodiment 1 | Embodiment 2 | Comp. Ex. 1 |
|---|---|---|---|---|
| Improper winding | mm | 0 | 0 | 0.6 |
| Slackness | N | 0.69 | 0.50 | 0.20 |

Embodiments 3 and 4 and

COMPARATIVE EXAMPLE 2

In Embodiments 3 and 4 and Comparative Example 2, a multiple layer structure of aramid was obtained by a jointly casting method. The thickness of the layers of the magnetic layer side and the thickness of the layer of the backcoat layer side were changed. The backcoat layer side was made the belt surface side during casting and the magnetic layer side was made the reverse thereof. The magnetic solution, lower layer solution, and backcoat solution were identical to those in Embodiment 1. The mean number of fillers on the aramid surface was determined by cutting cross-sections after embedding. The results of the measurement of individual physical properties are given in Table 2.

Table 2 below reveals that when the mean number of fillers in the cross-section of the nonmagnetic support of the dual structure was increased, improper winding increased and slackness resulted.

TABLE 2

|  |  | Embodiment 3 | Embodiment 4 | Comp. Ex. 2 |
|---|---|---|---|---|
| Magnetic layer Hc | Hc KA/m | 193 | 193 | 192 |
| Upper layer thickness | $\mu$m | 0.26 | 0.27 | 0.24 |
| Lower layer thickness | $\mu$m | 1.23 | 1.22 | 1.22 |
| Total thickness | $\mu$m | 6.3 | 6.2 | 6.3 |
| Nonmagnetic support | material | aramid | aramid | aramid |
| Layer structure thickness | $\mu$m | dual | dual | dual |
| Thickness of magnetic layer side | $\mu$m | 2.2 | 3.0 | 0.5 |
| Thickness of backcoat side | $\mu$m | 1.8 | 1.0 | 2.5 |
| Filler particle diameter | nm | 80 | 80 | 80 |
| Filler concentration prior to dissolution in concentrated sulfuric acid | Wt. % on magnetic layer side | 0.020 | 0.020 | 0.020 |
|  | Wt. % on backcoat layer side | 0.060 | 0.060 | 0.150 |
| Number of fillers |  |  |  |  |
| Magnetic layer side | no. per 100 $\mu$m$^2$ | 85 | 96 | 88 |
| Backcoat side | no. per 100 $\mu$m$^2$ | 356 | 340 | 805 |
| Mean number | no. per 100 $\mu$m$^2$ | 169 | 181 | 341 |
| Initial output | dB | 0 | −0.2 | −0.1 |
| Instantaneous clogging | no. per 123 min | 0 | 0 | 0 |
| Improper winding | mm | 0.2 | 0.2 | 0.7 |
| Slackness | N | 0.75 | 0.54 | 0.44 |

Embodiments 5 and 6 and

COMPARATIVE EXAMPLE 3

In Embodiments 5 and 6 and Comparative Example 3, the Hc was varied. Other conditions were identical to those in Embodiment 1. The results of measurement of various physical properties are given in Table 3.

Table 3 below reveals that when Hc decreased, output decreased.

TABLE 3

|  |  | Embodiment 5 | Embodiment 6 | Comp. Ex. 3 |
|---|---|---|---|---|
| Magnetic layer Hc | Hc KA/m | 239 | 195 | 147 |
| Upper layer thickness | $\mu$m | 0.26 | 0.28 | 0.25 |
| Lower layer thickness | $\mu$m | 1.24 | 1.23 | 1.21 |
| Total thickness | $\mu$m | 6.3 | 6.3 | 6.2 |
| Nonmagnetic support | material | aramid | aramid | aramid |
| Layer structure thickness | $\mu$m | single layer 4.0 | single layer 4.0 | single layer 4.0 |
| Thickness of magnetic layer side | $\mu$m | — | — | — |
| Thickness of backcoat side | $\mu$m | — | — | — |
| Filler particle diameter | nm | 80 | 80 | 80 |
| Filler concentration prior to | weight | 0.020 | 0.020 | 0.020 |

TABLE 3-continued

|  |  | Embodiment 5 | Embodiment 6 | Comp. Ex. 3 |
|---|---|---|---|---|
| dissolution in concentrated sulfuric acid | percent |  |  |  |
| Number of fillers | no. per 100 $\mu m^2$ | 110 | 110 | 105 |
| Initial output | dB | +0.8 | −0.2 | −2.5 |
| Instantaneous clogging | no. per 123 min | 0 | 0 | 0 |
| Improper winding | mm | 0 | 0 | 0 |
| Slackness | N | 0.70 | 0.75 | 0.77 |

Embodiments 7 and 8

In Embodiments 7 and 8, the thickness of the magnetic layer was varied. Otherwise, these embodiments were identical to Embodiment 1. The results of measurement of various physical properties are given in Table 4.

Table 4 below reveals that for a magnetic layer thickness ranging from 0.08 to 0.5 μm, good output, proper winding, and low slackness were achieved.

Embodiments 9, 10, and 11

In Embodiments 9, 10, and 11, the thickness of the lower nonmagnetic layer was varied. Otherwise, these embodiments were identical to Embodiment 1. The results of measurement of various physical properties are given in Table 5.

Table 5 below reveals that for a thin lower nonmagnetic layer thickness, initial output tended to decrease.

TABLE 4

|  |  | Embodiment 7 | Embodiment 8 |
|---|---|---|---|
| Magnetic layer Hc | Hc KA/m | 191 | 192 |
| Upper layer thickness | μm | 0.08 | 0.5 |
| Lower layer thickness | μm | 1.25 | 1.31 |
| Total thickness | μm | 6.6 | 7.2 |
| Nonmagnetic support | material | aramid | aramid |
| Layer structure thickness | μm | single layer 4.0 | single layer 4.0 |
| Thickness of magnetic layer side | μm | — | — |
| Thickness of backcoat side | μm | — | — |
| Filler particle diameter | nm | 80 | 80 |
| Filler concentration prior to dissolution in concentrated sulfuric acid | weight percent | 0.020 | 0.020 |
| Number of fillers | no. per 100 $\mu m^2$ | 115 | 126 |
| Initial output | dB | −1.0 | −1.5 |
| Instantaneous clogging | no. per 123 min | 0 | 0 |
| Improper winding | mm | 0 | 0 |
| Slackness | N | 0.72 | 0.71 |

TABLE 5

|  |  | Embodiment 9 | Embodiment 10 | Embodiment 11 |
|---|---|---|---|---|
| Magnetic layer Hc | Hc KA/m | 192 | 193 | 198 |
| Upper layer thickness | μm | 0.24 | 0.26 | 0.25 |
| Lower layer thickness | μm | 0.5 | 2.0 | 3.1 |
| Total thickness | μm | 5.3 | 6.8 | 7.9 |
| Nonmagnetic support | material | aramid | aramid | aramid |
| Layer structure thickness | μm | single layer 4.0 | single layer 4.0 | single layer 4.0 |
| Thickness of magnetic layer side | μm | — | — | — |
| Thickness of backcoat side | μm | — | — | — |
| Filler particle diameter | nm | 80 | 80 | 80 |
| Filler concentration prior to dissolution in concentrated sulfuric acid | weight percent | 0.020 | 0.020 | 0.020 |
| Number of fillers | no. per 100$\mu m^2$ | 113 | 108 | 119 |
| Initial output | dB | −2.1 | +0.7 | +1.2 |
| Instantaneous clogging | no. per 123 min | 0 | 0 | 9 |
| Improper winding | mm | 0 | 0 | 0 |
| Slackness | N | 0.52 | 0.81 | 0.68 |

Embodiment 12 and 13 and

COMPARATIVE EXAMPLE 4

In Embodiments 12 and 13 and Comparative Example 4, the diameter of the filler particles was varied. All other conditions were identical to those in Embodiment 1. The results of measurement of various physical properties are given in Table 6.

Table 6 below reveals that when the filler particle diameter was a large 400 nm, even when the number of fillers was 200 pieces/100 $\mu m^2$, initial output and instantaneous clogging worsened.

TABLE 6

|  |  | Embodiment 12 | Embodiment 13 | Comp. Ex. 4 |
|---|---|---|---|---|
| Upper layer | Hc KA/m | 190 | 191 | 192 |
|  | Thickness $\mu m$ | 0.28 | 0.26 | 0.27 |
| Lower layer | Thickness $\mu m$ | 1.21 | 1.20 | 1.27 |
| Total thickness | Thickness $\mu m$ | 6.3 | 6.2 | 6.3 |
| Nonmagnetic support | material | aramid | aramid | aramid |
|  | Layer structure thickness $\mu m$ | single layer 4.0 | single layer 4.0 | single layer 4.0 |
|  | Thickness of magnetic layer side $\mu m$ | — | — | — |
|  | Thickness of backcoat side $\mu m$ | — | — | — |
| Filler particle diameter | nm | 40 | 200 | 400 |
| Filler concentration prior to dissolution in concentrated sulfuric acid | weight percent | 0.0005 | 0.40 | 2.5 |
| Number of fillers | no. per 100 $\mu m^2$ | 177 | 190 | 189 |
| Initial output | dB | −0.1 | −1.5 | −3.2 |
| Instantaneous clogging | no. per 123 min | 1 | 2 | 19 |
| Improper winding | mm | 0 | 0 | 0.4 |
| Slackness | N | 0.52 | 0.81 | 0.72 |

[Embodiments of Magnetic Recording Medium (2)]
<Method of Preparing Magnetic Tape>

The same coating materials and methods were employed as in Embodiment 1 to produce a magnetic tape (Embodiment 14). In Embodiment 14, it was possible to cast [the dope] onto a belt (moving at 12 m/min) of tantalum polished to a mirror finish at a discharge linear velocity of 3.5 m/min from a die having slits measuring 0.15 mm×300 mm, blow roughly 90° C. air having a relative humidity of about 85 percent, render the flowing dope optically isotropic, and impart capping to the film itself while directing the dope along with the belt into a −5° C., 15 weight percent sulfuric acid aqueous solution and solidifying the dope.

Various characteristics of the magnetic recording tape obtained were measured by the following methods.

Magnetic characteristics, the thickness of the magnetic layer and the lower layer, the total tape thickness, and the number of fillers were measured in the same manner as in Embodiment 1. Reproduction output was measured in the same manner as in Embodiment 1 but the target was set at equal to or higher than −0.5 dB.

<Capping (also Referred to as curl d)>

The tape was cut into 10 cm pieces and placed on a smooth disk. The distance from the surface of the disk to the upper edge of the tape when the tape was placed in a free state with the magnetic layer facing upward was denoted as d.

<Thermal Shrinkage>

A load of 0.1 N was applied over an about 10 cm length of sample for one week at 60° C. and 90 percent and the sample was stored. The lengths before and after storage were measured by comparator to obtain the rate of change.

<Storage Property: Core Side DO>

The tape was loaded into a large cassette of commercial digital VTR (DVCPRO) (25 MBPS-183 minutes in length) and after recording, stored for one week at 60° C. and 90 percent following recording, and replayed. On the cassette reel core side, the time required for the DO (1 $\mu s$-8 dB) to exceed 300 pieces per minute was measured.

<Full-Length Running>

An AJ-D750 commercial digital VTR (DVCPRO) (made by Matsushita Electric Industry Co., Ltd.) was employed to repeatedly reproduce and rewind 100 times at 5° C. and 80 percent RH. Improper winding was evaluated along with full-length running. Before commencing full-length running, 380 m was wound on a supply reel and the diameter of the windings was measured. The full length was then recorded, and after 100 reproduction runs (playing and rewinding), it was rewound on the supply reel and the winding diameter was measured again. The increase in winding diameter before and after running was taken as the amount of improper winding. Equal to or less than 0.4 mm was desired from a practical viewpoint.

In Comparative Example 5 and Embodiments 15 and 17, a capping of the support was formed during manufacturing films. In Embodiment 18, the thickness of the lower layer and the backcoat layer were varied to adjust the amount of capping. In Embodiment 16, the heat treatment was reduced, and in Embodiment 17, no heat treatment was conducted.

TABLE 7

|  |  | Embod. 14 | Comp. Ex. 5 | Embod. 15 | Embod. 16 | Embod. 17 | Embod. 18 |
|---|---|---|---|---|---|---|---|
| Tape Hc | KA/m | 190 | → | → | → | → | → |
| Upper layer thickness | μm | 0.25 | → | → | → | → | → |
| Lower layer thickness | μm | 1.4 | → | → | → | → | 1.1 |
| Backcoat thickness | μm | 0.6 | → | → | → | → | 0.9 |
| Total thickness | μm | 6.3 | → | → | → | → | → |
| Nonmagnetic support | material | aramid | → | → | → | → | → |
| Layer structure thickness | μm | single layer 4.0 | → |  |  |  |  |
| Filler particle diameter | nm | 80 | → | → | → | → | → |
| Filler concentration prior to dissolution in concentrated sulfuric acid | wt. % | 0.015 | → | → | → | → | → |
| No. of fillers | no./100 μm² | 60 | → | → | → | → | → |
| Capping | mm | 0.5 | 0.2 | 0.95 | 0.6 | 1.0 | 0.9 |
| Thermal shrinkage | % | 0.27 | → | → | 0.33 | 0.45 | 0.27 |
| Initial output | dB | 0.2 | 0.2 | 0.1 | 0.2 | 0.4 | −0.1 |
| Improper winding | mm | 0 | 0 | 0 | 0 | 0 | 0 |
| Sullying of running system | 5 point method | 4.5 ○ | 2.5 × | 4.2 ○ | 5.0 ○ | 4.5 ○ | 4.5 ○ |
| Storage property Core side DO | min | 2 min | 2 min | 2 min | 8 min × | 20 min × | 2 min |

A comparison of Embodiments 14–18 and Comparative Example 5 reveals that when capping (protruding of the magnetic layer) ranged from 0.5 to 1.0 mm, there was little sullying of the running system but when capping was 0.2 mm, sullying of the running system worsened. Further, it was desirable to keep thermal shrinkage to a low range equal to or less than 0.3 percent to inhibit core side DO.

Embodiments 19 and 20 and Comparative Examples 6 and 7 were produced by varying the concentration of filler. The magnetic solution, lower layer solution, and backcoat layer solution were identical to those of Embodiment 14. In each case, cross-sections were cut after embedding and the mean number of fillers in the aramid surface was calculated.

TABLE 8

|  |  | Embod. 19 | Embod. 20 | Comp. Ex. 6 | Comp. Ex. 7 |
|---|---|---|---|---|---|
| Tape Hc | KA/m | 190 | → | → | → |
| Upper layer thickness | μm | 0.25 | → | → | → |
| Lower layer thickness | μm | 1.4 | → | → | → |
| Backcoat thickness | μm | 0.6 | → | → | → |
| Total thickness | μm | 6.3 | → | → | → |
| Nonmagnetic support | material | aramid | → | → | → |
| Layer structure thickness | μm | single layer 4.0 | → |  |  |
| Filler particle diameter | nm | 80 | → | → | → |
| Filler concentration prior to disolution in concentrated sulfuric acid | wt. % | 0.004 | 0.045 | 0.055 | 0.074 |
| No. of fillers | no./100 μm² | 16 | 190 | 220 | 305 |
| Capping | mm | 0.6 | → | → | → |
| Thermal shrinkage | % | 0.26 | → | → | → |
| Initial output | dB | 0.2 | 0 | 0.1 | −0.2 |
| Improper winding | mm | 0 | 0 | 0.4 × | 0.5 × |
| Sullying of running system | 5 point method | 4.5 ○ | 4.0 ○ | 3.0 Δ | 2.5 × |
| perservability Core side DO | min | 2 min | 2 min | 2 min | 2 min |

A comparison of Embodiments 19 and 20 and Comparative Examples 6 and 7 reveals that when the number of fillers in the cross-section of the support ranged from 16 to 190 pieces per 100 μm², there was no improper winding and little sullying with running. However, when the number of fillers exceeded 200 pieces/100 μm², improper winding was substantial and sullying with running worsened.

Embodiments 21 and 22 and Comparative Example 8 were imparted with multilayer structures of aramid by a jointly casting method. The thicknesses of the layers on the magnetic layer side and of layers on the backcoat layer side were varied and the filler concentration was varied. The backcoat layer side was made the belt surface side during casting and the magnetic layer side was made the reverse side. The magnetic solution, lower layer solution, and backcoat solution were identical to those in Embodiment 14. In each case, cross-sections were cut following embedding and the mean number of fillers in the aramid surface was determined.

TABLE 9

|  |  | Embod. 21 | Embod. 22 | Comp. Ex. 8 |
|---|---|---|---|---|
| Tape Hc | KA/m | 190 | → | → |
| Upper layer thickness | μm | 0.25 | → | → |
| Lower layer thickness | μm | 1.4 | → | → |
| Backcoat thickness | μm | 0.6 | → | → |
| Total thickness | μm | 6.3 | → | → |
| Nonmagnetic support | material | aramid | → | → |
| Layer structure thickness | μm | dual | → | → |
| Thickness of magnetic layer side | μm | 2 | 3.5 | 2 |
| Thickness of backcoat side | μm | 2 | 0.5 | 2 |
| Filler particle diameter | nm | 80 | → | → |
| Filler concentration prior to dissolution in concentrated sulfuric acid | wt. % of magnetic layer side | 0.015 | → | → |
|  | wt. % of backcoat layer side | 0.06 | → | 0.12 |
| Number of fillers |  |  |  |  |
| magnetic layer side | no./100 μm² | 63 | 63 | 61 |
| backcoat side | no./100 μm² | 252 | 252 | 495 |
| average number of fillers | no./100 μm² | 153 | 86 | 282 |
| Capping | mm | 0.6 | → | → |
| Thermal shrinkage | % | 0.26 | → | → |
| Initial output | dB | 0.2 | 0 | 0.1 |
| Improper winding | mm | 0 | 0 | 0.5 × |
| Sullying of running system perservability | 5 point method | 4.5○ | 5.0○ | 2.5 × |
| Core side DO | min | 2 min | 2 min | 2 min |

A comparison of Embodiments 21 and 22 and Comparison Example 8 reveals that even when the support was a dual base, if the mean number of fillers (the average of each layer since a dual base was employed) in the cross-section of the support ranged from 10 to 200 pieces per 100 μm², there was no improper winding and little sullying with running but if the number of fillers exceeded 200 pieces/100 μm², improper winding increase significantly and sullying with running decreased.

In Embodiments 23 and 24 and Comparison Example 9, the diameter of filler particles was varied. Other conditions were identical to those of Embodiment 14.

TABLE 10

|  |  | Embodiment 23 | Embodiment 24 | Comp. Ex. 9 |
|---|---|---|---|---|
| Upper layer thickness | Hc KA/m | 190 | → | → |
|  | Thickness μm | 0.25 | → | → |
| Lower layer | Thickness μm | 1.4 | → | → |
| backcoat | Thickness μm | 0.6 | → | → |
| Total thickness | Thickness μm | 0.6 | → | → |
| Nonmagnetic support | material | aramid | → | → |
|  | Layer structure thickness μm | single layer 4.0 | → | → |
| Filler particle diameter | nm | 150 | 190 | 250 |
| Filler concentration prior to dissolution in concentrated sulfuric acid | weight percent | 0.06 | 0.1 | 0.3 |
| Number of fillers | no. per 100 μm² | 36 | 32 | 40 |
| Capping | mm | 0.62 | 0.62 | 0.6 |
| Thermal shrinkage | % | 0.26 | 0.28 | 0.28 |
| Initial output | dB | 0.2 | −0.2 | −1.1 |
| Improper winding | mm | 0 | 0 | 0 |
| Sullying of running system perservability | 5 point method | 4.50○ | 5.0○ | 4.5○ |
| Core side DO | min | 2 min | 2 min | 2 min |

A comparison of Embodiments 23 and 24 and Comparative Example 9 reveals that when the diameter of filler particles was 250 nm, the surface became rough and output decreased.

In Embodiments 25 and 26, the thickness of the magnetic layer was varied. To make the total thickness conform, the thicknesses of the lower layer and backcoat layer were also varied. Other conditions were identical to those of Embodiment 14.

TABLE 11

|  |  | Embodiment 25 | Embodiment 26 |
|---|---|---|---|
| Upper layer thickness | Hc KA/m | 190 | → |
|  | Thickness μm | 0.05 | 0.9 |
| Lower layer | Thickness μm | 1.6 | 1.1 |
| backcoat | Thickness μm | 0.6 | 0.4 |
| Total thickness | Thickness μm | 6.3 | 6.4 |
| Nonmagnetic support | material | aramid | → |
|  | Layer structure thickness μm | single layer 4.0 | → |
| Filler particle diameter | nm | 80 | → |
| Filler concentration prior to dissolution in concentrated sulfuric acid | weight percent | 0.015 | → |
| Number of fillers | no. per 100 μm$^2$ | 62 | 62 |
| Capping | mm | 0.51 | 0.42 |
| Thermal shrinkage | % | 0.25 | 0.24 |
| Initial output | dB | 0.2 | −0.2 |
| Improper winding | mm | 0 | 0 |
| Sullying of running system perservability | 5 point method | 4.0○ | 5.0○ |
| Core side DO | min | 1 min | 1 min |

Embodiments 25 and 26 reveal that the effect of the present invention can be achieved even when varying the thickness of the magnetic layer. However, the output in Embodiment 26, which had a thick magnetic layer of 0.9 μm in thickness, decreased somewhat.

The present invention can provide a magnetic recording medium having good electromagnetic characteristics and good running durability with good mass productivity. Further, the present invention can provide a magnetic recording medium having good electromagnetic characteristics, good running durability, and good dimensional stability with storage with good mass productivity.

The present disclosure relates to the subject matter contained in Japanese Patent Application No. 2000-236061 filed on Aug. 3, 2000 and Japanese Patent Application No. 2000-248189 filed on Aug. 18, 2000, which is expressly incorporated herein by reference in its entirety.

What is claimed is:

1. A magnetic recording medium having on one surface of a nonmagnetic support a lower layer comprising an inorganic powder and a binder and an upper magnetic layer comprising a ferromagnetic powder and a binder in that order, and having on the other surface thereof a backcoat layer, wherein:
   said nonmagnetic support comprises inorganic powder particles with a mean primary particle diameter in a range of from 40 to 200 nm;
   the number of particles of said inorganic powder in the cross-section of said nonmagnetic support is in a range of from 10 to 200/100 μm$^2$,
   said magnetic layer exhibits a coercivity in a range of from 159 to 239 kA/m; and,
   the overall thickness is equal to or less than 8 μm.

2. The magnetic recording medium of claim 1, wherein said nonmagnetic support comprises inorganic powder particles with a mean primary particle diameter in a range of from 40 to 180 nm.

3. The magnetic recording medium of claim 1, wherein the number of particles of said inorganic powder in the cross-section of said nonmagnetic support is in a range of from 10 to 180/100 μm$^2$.

4. The magnetic recording medium of claim 1, wherein said magnetic layer exhibits a coercivity in a range of from 191 to 239 kA/m.

5. The magnetic recording medium of claim 1, wherein the number of particles of said inorganic powder in the cross-section of said nonmagnetic support is in a range of from 20 to 200/100 μm$^2$.

6. The magnetic recording medium of claim 1, wherein the number of particles of said inorganic powder in the cross-section of said nonmagnetic support is in a range of from 30 to 180/100 μm$^2$.

7. A magnetic recording medium having on one surface of a nonmagnetic support a lower layer comprising an inorganic powder and a binder and an upper magnetic layer comprising a ferromagnetic powder and a binder in that order, and having on the other surface thereof a backcoat layer, wherein:
   said nonmagnetic support comprises inorganic powder particles with a mean primary particle diameter in a range of from 10 to 200 nm;
   the number of particles of said inorganic powder in the cross-section of said nonmagnetic support is in the range of from 10 to 200/100 μm$^2$,
   the amount of curl d in the direction of width of said magnetic recording medium is equal to or higher than 0.4 mm and equal to or less than 1.0 mm in the direction of protrusion of the magnetic layer at a width of 6.35 mm; and, the overall thickness is equal to or less than 8 μm.

8. The magnetic recording medium of claim 7, wherein said nonmagnetic support comprises inorganic powder particles with a mean primary particle diameter in a range of from 40 to 200 nm.

9. The magnetic recording medium of claim 7, wherein said nonmagnetic support comprises inorganic powder particles with a mean primary particle diameter in a range of from 40 to 120 nm.

* * * * *